(12) United States Patent
Shin et al.

(10) Patent No.: US 6,869,476 B2
(45) Date of Patent: Mar. 22, 2005

(54) WATERPROOF ADMIXTURE COMPOSITION FOR CONCRETE HAVING EXCELLENT ANTI-CORROSIVE PERFORMANCE

(75) Inventors: Do-Chul Shin, Incheon (KR); Won-Hwa Kim, Ansan-Si (KR)

(73) Assignee: Jang San Waterproof Industrial Co., Ltd. (KR)

( * ) Notice: Subject to any disclaimer, the term of this patent is extended or adjusted under 35 U.S.C. 154(b) by 0 days.

(21) Appl. No.: 10/723,466

(22) Filed: Nov. 25, 2003

(65) Prior Publication Data

US 2004/0103814 A1 Jun. 3, 2004

(30) Foreign Application Priority Data

Nov. 27, 2002 (KR) .................. 10-2002-0074259

(51) Int. Cl.$^7$ .................. C09K 3/18; C04B 14/00; C04B 18/06; C04B 22/08
(52) U.S. Cl. .................. 106/823; 106/2; 106/708; 106/724; 106/731
(58) Field of Search .................. 106/2, 708, 724, 106/731, 823

(56) References Cited

U.S. PATENT DOCUMENTS 5,522,927 A * 6/1996 Hegge .................. 106/659

FOREIGN PATENT DOCUMENTS

| JP | 6-219810 A * | 8/1994 |
|---|---|---|
| KR | 1987-0001288 | 3/1987 |
| KR | 1989-0005242 | 5/1989 |
| KR | 2000-0020503 | 4/2000 |
| KR | 2001-0038952 | 5/2001 |
| WO | WO99/28264 A1 * | 6/1999 |

OTHER PUBLICATIONS

Derwent Abstract No. 1995–207366, abstract of Chinese Patent Specification No. 1084146A (Mar. 1994).*
Derwent Abstract No. 2002–336892, abstract of Korean Patent Specification No. 356354B (Oct. 2002).*
Derwent Abstract No. 2003–551839, abstract of Korean Patent Specification No. 2003028997A (Apr. 2003).*
Derwent Abstract No. 2004–600306, abstract of Korean Patent Specification No. 2003033115A (May 2003).*

* cited by examiner

*Primary Examiner*—Anthony J. Green
(74) *Attorney, Agent, or Firm*—Cantor Colburn LLP

(57) ABSTRACT

Disclosed herein is a waterproof admixture composition for concrete which is added to fabricate concrete having excellent anti-corrosive performance. The waterproof admixture composition can protect reinforcing steel bars against oxidation in the presence of salt, thereby ensuring excellent anti-corrosive performance and thus greatly improving the durability of reinforced concrete even in salt-damaged areas and corrosive environments and the like by inhibiting the corrosion of the reinforced concrete. The waterproof admixture composition comprises fly ash and silica fume as artificial pozzolan activators, a redispersible powders resin, a higher fatty acid-based metal salt and a high performance water-reducing agent wherein the composition further comprises 18 to 34% by weight of an inorganic salt and 1 to 5% by weight of tannin as an antioxidant, based on the total weight of the composition.

5 Claims, No Drawings

US 6,869,476 B2

WATERPROOF ADMIXTURE COMPOSITION FOR CONCRETE HAVING EXCELLENT ANTI-CORROSIVE PERFORMANCE

BACKGROUND OF THE INVENTION

1. Field of the Invention

The present invention relates to a waterproof admixture composition for concrete which is added to fabricate concrete having excellent anti-corrosive performance, and more particularly to a waterproof admixture composition for concrete having excellent anti-corrosive performance which can protect reinforcing steel bars in concrete against oxidation in the presence of salt, thereby exhibiting excellent anti-corrosive performance and thus greatly improving the durability of reinforced concrete. As a result, the waterproof admixture composition for concrete can be effectively used even in salt-damaged areas and corrosive environments and the like.

2. Description of the Related Art

Various structures made of concrete are exposed to special environmental conditions, e.g., physical and chemical conditions, which directly or indirectly affect the concrete structures. Particularly, most concrete facilities are likely to be exposed to moisture such as rain, causing the deterioration in the performance of concrete facilities. As a result, the concrete facilities are considerably reduced in durability.

In order to solve these problems due to moisture, waterproofing treatments are commonly performed on most concrete facilities. However, since the waterproofing treatments are performed by coating a waterproof admixture onto the surface of concrete facilities, concrete facilities which are located in highly humid conditions and coastal areas cannot be sufficiently protected against moisture by the surface coating.

Various kinds of waterproof admixtures capable of preventing the absorption and leakage of moisture in the course of fabricating concrete have been developed and are currently used.

Korean Patent Laid-open No. 89-5242 discloses a powdery waterproof admixture formulated by adding carbon black or an aluminum silicate-based inorganic powder to a fatty acid metal salt and paraffin chloride and mixing the resulting mixture with a polymeric resin and a dispersion agent.

Korean Patent Laid-open No. 87-1288 provides a waterproof admixture composition comprising fly ash as a main component, sodium metasilicate (water glass), zinc stearate as a fatty acid metal salt and a high early strength additive.

Korean Patent Publication No. 87-1543 provides a waterproof admixture comprising fly ash as a main component, methylcellulose, barium chloride, sodium metasilicate, pozzolith and zinc stearate. However, since the barium chloride may cause the corrosion of reinforcing steel bars in concrete due to chlorides generated upon hydrating, the waterproof admixture is unsuitable for concrete structures.

Korean Patent Laid-open No. 01-38952 discloses a spherical powder waterproof admixture composition comprising silica fume as a main component, a higher fatty acid metal salt (zinc stearate), a fluidizing agent, and an AE (air entraining agent) water-reducing agent and silica.

The waterproof admixture powders and compositions mentioned above can increase the water tightness of the concrete using water-repellent components including fatty acid or paraffin as a main component, pozzolan or silica fume, but have problems in that since they deteriorate the strength of concrete facilities, they cause the deterioration in performance and corrode reinforcing steel bars used in the concrete facilities.

Korean Patent No. 356354, which was filled by the present inventors, discloses a spherical waterproof admixture composition for concrete comprising fly ash as an artificial pozzolan activator and silica fume as main components, ethylene vinyl acetate as a redispersible powders polymer, zinc stearate as a higher fatty acid metal salt and naphthalene sulfonate as a high early strength additive. Since the composition exhibits a waterproofing performance comparable to conventional waterproof admixtures, and at the same time, induces improvement in the strength of concrete structures, deterioration in the performance of the structures is inhibited and thus the durability is greatly improved.

Although the waterproof admixture composition attains improved anti-corrosive effects compared to conventional compositions, it has problems that when the composition is utilized on concrete structures located in highly salty coastal and sea areas and environmental contaminant-processing facilities, satisfactory anti-corrosive effects cannot be obtained and thus deterioration in the performance and durability of the concrete structures cannot be avoided.

The concrete structures located in highly salty coastal and sea areas and environmental contaminant-processing facilities contain chloride ions and acidic anions to a considerable extent due to various factors. These ions destroy passivity layers formed around reinforcing steel bars used in the concrete structures, leading to corrosion of the reinforcing steel bars. The corrosion reduces the entire strength of the structures and swells the volume of the reinforcing steel bars to 2.5 times larger than their original volume. Such a swelling pressure forms cracks in the concrete structures. Oxygen and water permeate the concrete structures through the cracks, promoting the corrosion of the reinforcing steel bars and greatly deteriorating the performance of the structures.

SUMMARY OF THE INVENTION

Therefore, the present invention has been made in view of the above problems, and it is an object of the present invention to provide a waterproof admixture composition for concrete having excellent anti-corrosive performance which can protect reinforcing steel bars against oxidation in the presence of salt, thereby ensuring excellent anti-corrosive performance and thus greatly improving the durability of reinforced concrete even in salt-damaged areas and corrosive environments and the like by inhibiting the corrosion of the reinforced concrete.

In order to accomplish the above object of the present invention, there is provided a waterproof admixture composition for concrete having excellent anti-corrosive performance, comprising fly ash and silica fume as artificial pozzolan activators, a redispersible powders resin, a higher fatty acid-based metal salt and a high performance water-reducing agent, wherein the composition further comprises 18 to 34% by weight of an inorganic salt and 1 to 5% by weight of tannin as an antioxidant, based on the total weight of the composition.

DESCRIPTION OF THE PREFERRED EMBODIMENTS

Hereinafter, the present invention will be explained in more detail.

The waterproof admixture composition of the present invention comprises fly ash and silica fume as artificial pozzolan activators, a higher fatty acid-based metal salt, a redispersible powders resin, an inorganic salt, tannin as an antioxidant and a high performance water-reducing agent.

The fly ash and silica fume are used as main components in the composition.

The inorganic salt and tannin as an antioxidant are added to the composition to further improve anti-corrosive performance and protect reinforcing steel bars in concrete against oxidation, thereby preventing the corrosion of reinforced concrete.

The inorganic salt as a corrosion inhibitor protects reinforcing steel bars in reinforced concrete against corrosion. A small amount of the inorganic salt can sufficiently prevent reinforcing steel bars in concrete and steel materials from being corroded without negatively affecting the concrete.

Calcium nitrite or sodium nitrite is preferably used as the inorganic salt. It is most effective that the amount of the inorganic salt added is in the range of 18 to 34% by weight, based on the total weight of the composition. Particularly, when the inorganic salt is added in an amount of less than 18% by weight, the corrosion inhibitory effects are not sufficiently attained and thus the performance of concrete is deteriorated. When the inorganic salt is added in an amount exceeding 34% by weight, the setting time is too short and thus workability of concrete is decreased. Accordingly, the inorganic salt is preferably added within this range.

When calcium nitrite or sodium nitrite capable of generating nitrite ions ($NO_2^-$) as the inorganic salt is added to the composition, the nitrite ions chemically react with iron ions ($Fe^{++}$) eluted from reinforced concrete to form a stable compound $Fe_2O_3$ while inhibiting the formation ferric hydroxide [$Fe(OH)_3$], which is a rust component, as depicted in Reaction Scheme 1

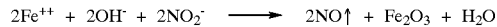

$$2Fe^{++} + 2OH^- + 2NO_2^- \longrightarrow 2NO\uparrow + Fe_2O_3 + H_2O$$

Since the compound $Fe_2O_3$ forms coating on corroded points formed on the steel surface, further corrosion of steel is inhibited.

Accordingly, chloride ions, water, oxygen and the like penetrate the reinforced concrete through cracks formed in the concrete and promote the corrosion of the reinforced concrete and finally destroy passivity layers. When such corrosion is initiated at a certain point of the reinforced concrete and rust begins to form at the point, ferrous hydroxide, which is an intermediate of rust, chemically reacts with a metal nitrite to form stable $Fe_2O_3$ and the formed $Fe_2O_3$ covers the point. Accordingly, corrosion of the reinforced concrete does not progress.

As described above, the waterproof admixture composition of the present invention further comprises an inorganic salt and tannin as an antioxidant. Since the tannin is composed of catechin or derivatives thereof having a flavanol structure and thus has a number of hyroxyl groups, it can easily bind to various materials.

Commonly, calcium hydroxide having a pH of 12~13 is formed in concrete through hydration with cement. Thereafter, the concrete comes in contact with carbon dioxide in air to form calcium carbonate, which has a pH of 8.5~10. This phenomenon is called "neutralization" or "carbonation". The neutralization of concrete causes the corrosion of reinforced concrete, deteriorates the performance of concrete structures, and negatively affects the porosity and pore size distribution of concrete, increasing the dry shrinkage of the concrete.

As described above, since hydroxyl groups contained in tannin as an antioxidant react with calcium salts of calcium silicate hydrate ($CaO-SiO_2-nH_2O$), which is formed by hydration of cement, the carbonation between the calcium silicate hydrate and carbon dioxide in air is prevented. In addition, the hydroxyl groups bind to the carbonated calcium carbonate to make the pH of the concrete alkaline. Accordingly, the tannin effectively inhibits neutralization of concrete and corrosion of reinforcing steel bars.

When the tannin as an antioxidant is added in an amount of less than 1% by weight based on the total amount of the composition, the antioxidant effects are unsatisfactory and thus the performance of concrete is not improved. When the tannin as an antioxidant is added in an amount exceeding 5% by weight, there is little improvement in the antioxidant effects provided by the tannin. Accordingly, the tannin is preferably added within this range.

The inorganic salt and tannin as an antioxidant are added to the composition to further improve anti-corrosive performance and protect reinforcing steel bars in concrete against oxidation, thereby preventing the corrosion of reinforced concrete.

In a preferred embodiment, the waterproof admixture composition of the present invention comprises 40~60% by weight of fly ash as an artificial pozzolan activator, 6~12% by weight of silica fume, 0.5~5% by weight of a redispersible powders resin, 5~11% by weight of a higher fatty acid-based metal salt, 1~6% by weight of a high performance water-reducing agent, 18~34% by weight of an inorganic salt and 1~5% by weight of tannin as an antioxidant, based on the total weight of the composition.

The fly ash used as a pozzolan activator is obtained by burning fine coal as a fuel in a combustion boiler of a thermoelectric power plant at a temperature as high as 1,400° C. and collecting coal ash contained in the exhausted waste gas using a dust collector. The main components of the fly ash are silica and alumina. The fly ash commonly has a specific surface area of 3,000~4,500 cm$^2$/g, a specific gravity of 1.9~2.3 and a particle size of 1~150 μm.

The fly ash itself has no reactivity to hydration, but slowly reacts with calcium hydroxide, which is a hydration product of soluble silic acid and cement, at room temperature, to form insoluble and stable calcium silicate hydrate ($CaO-SiO_2-nH_2O$). This reaction is called the 'pozzolan reaction'. The calcium silicate hydrate improves concrete quality, e.g., improved water tightness of concrete, high strength at long-term ages, improved fluidity of concrete, lowered hydration heat, inhibited alkaline aggregate reaction and improved resistance to sulfate.

The fly ash can be added within the range adopted to formulate a common waterproof admixture. In the present invention, the fly ash is preferably added in the range of 40 to 60% by weight, based on the total weight of the composition.

The silica fume used as another artificial pozzolan activator is a by-product in a floating ultrafine particulate state which is obtained together with gases exhausted during producing silicon or a silicate alloy such as ferrosilicon in an electric furnace. The main component of the silica fume is amorphous silica. The silica fume commonly has a gravity of about 2.2 and a particle size of 1 μm or smaller, preferably an average particle size of about 0.1 μm, and an average specific surface area of about 200,000 cm$^2$/g.

Since the silica fume has a high degree of powder and contains a large amount of silica, it effectively causes a pozzolan reaction, compared to the fly ash. The silica fume undergoes a pozzolan reaction with calcium hydroxide to form calcium silicate hydrate ($CaO$—$SiO_2$—$nH_2O$). Accordingly, since the use of the silica fume as an artificial pozzolan activator enables the formation of very dense and cured tissues due to excellent pozzolan reactivity, high strength and good water tightness are obtained.

The silica fume can be added within the range adopted to formulate a common waterproof admixture. In the present invention, the silica fume is preferably added in the range of 6 to 12% by weight, based on the total weight of the composition.

The waterproof admixture composition of the present invention comprises a higher fatty acid salt. The higher fatty acid salt reacts with soluble calcium hydroxide ($Ca(OH)_2$) produced through hydration of cement. At this time, fatty acid groups bind to hydroxyl groups to form a highly water-repellent higher fatty acid calcium. Since the higher fatty acid salt has excellent water-repellence, it reduces the water absorption by capillaries formed inside concrete. A stearic acid salt or oleic acid salt can be used as the higher fatty acid salt. The amount of the higher fatty acid salt may be within the range adopted to formulate a common waterproof admixture. In the present invention, the higher fatty acid salt is preferably added in the range of 5 to 11% by weight, based on the total weight of the composition.

In addition to the higher fatty acid salt, the waterproof admixture composition of the present invention further comprises a redispersible powders polymer for improving waterproofness and dynamic physical properties of cement mortar and concrete. The redispersible powders polymer is stably dispersed in water and forms a water-insoluble irreversible polymer film after dried or cured. Specifically, the redispersible powders polymer is uniformly dispersed in a cement paste during fabricating cement mortar or concrete to form a cement gel due to cement hydration. At this time, the polymer particles are deposited onto the surface of the cement gel to form an insoluble coating or fill the capillaries and gel pores formed in the cement. Accordingly, the redispersible powders polymer increases the flexural strength of members, prevents the occurrence of cracks due to cement shrinkage, and at the same time, acts as a binder in the course of cement drying or curing, thereby increasing the adhesion to the organic and inorganic particles present in the cement, wear resistance and flexibility of the cement mortar.

The redispersible powders polymer is generally selected from vinyl acetate homopolymers, vinyl acetate/ethylene copolymers, styrene-acrylate copolymers and ethylene/vinyl laurate/vinyl chloride terpolymers.

Additionally, the waterproof admixture composition of the present invention further comprises a high performance water-reducing agent for improving the strength and fluidity of cement mortar or concrete. The high performance water-reducing agent can be added within the range adopted to formulate a common waterproof admixture. In the present invention, the high performance water-reducing agent is preferably added in the range of 1 to 6% by weight, based on the total weight of the composition. Examples of the water-reducing agent include polynaphthalene sulphonate and polymelamin sulphonate.

When the waterproof admixture composition of the present invention is added to fabricate concrete, it can exhibit excellent waterproofing and anti-corrosive effects. The waterproof admixture composition is preferably added in an amount of 2.0~6.0 parts by weight to fabricate concrete, based on 100 parts by weight of cement. When the amount of the waterproof admixture composition added is less than 2 parts by weight, satisfactory waterproofing and anti-corrosive effects are not attained. When the amount of the waterproof admixture composition exceeds 6 parts by weight, the setting time is too short and thus workability of concrete is decreased. Accordingly, the waterproof admixture composition is preferably added within this range.

The waterproof admixture composition within the range defined in the present invention prevents the corrosion of reinforcing steel bars through chemical and physical interaction with concrete and the reinforcing steel bars, and reduces the water permeability and absorptivity through the formation of water tight cured bodies of concrete and highly water resistant hydrated tissues, thereby fabricating highly durable concrete. In particular, since the waterproof admixture composition exhibits excellent waterproofing performance and thus protects reinforcing steel bars against oxidation in the presence of salt, thereby ensuring excellent anti-corrosive performance, it can be usefully used even in salt-damaged areas and corrosive environments and the like.

The present invention will now be described in more detail with reference to the following examples. These examples are provided to assist in a further understanding of the present invention, and are not to be construed as limiting the scope of the invention.

EXAMPLES 1 TO 8

780 parts by weight of calcium nitrite as an inorganic salt, 60 parts by weight of tannin as an antioxidant, 1,383 parts by weight of fly ash, 288 parts by weight of silica fume, 231 parts by weight of a higher fatty acid-based metal salt, 120 parts by weight of polynaphthalene sulphonate, 138 parts by weight of a redispersible powders polymer containing an ethylene/vinyl laurate/vinyl chloride terpolymer as a main component, were mixed to formulate a waterproof admixture.

1.0, 2.0, 3.0, 4.0, 5.0, 6.0, 7.0 and 8.0 parts by weight of the waterproof admixture thus formulated were added to 100 parts by weight of cement to fabricate concrete, respectively. Slumps, air amount, setting time, compressive strength, water permeability ratio, water absorption ratio and relative resilient modulus of the concrete were measured in accordance with the KS F 4926 standard method. The results are shown in Table 2 below. The blending conditions for fabricating the concrete are listed in Table 1 below.

COMPARATIVE EXAMPLES 1 AND 2

1,360 parts by weight of fly ash was charged into an operating blender, and then 10 parts by weight of methylcellulose, 500 parts by weight of zinc stearate, 15 parts by weight of barium chloride, 100 parts by weight of pozzolith (standard type) and 15 parts by weight of sodium metasilicate were sequentially added thereto to formulate a waterproof admixture.

3 and 5 parts by weight of the waterproof admixture thus formulated were added to 100 parts by weight of cement to fabricate concrete, respectively. Slumps, air amount, setting time, compressive strength, water permeability ratio, water absorption ratio and relative resilient modulus of the concrete were measured in accordance with the KS F 4926 standard method. The results are shown in Table 2 below. The blending conditions for fabricating the concrete are listed in Table 1 below.

COMPARATIVE EXAMPLE 3

Concrete was fabricated without the addition of a waterproof admixture. Slumps, air amount, setting time, compressive strength, water permeability ratio, water absorption ratio and relative resilient modulus of the concrete were measured in accordance with the KS F 4926 standard method. The results are shown in Table 2 below. The blending conditions for fabricating the concrete are listed in Table 1 below.

TABLE 1

| Example. No | W/C (%) | S/A (%) | Amounts of respective materials (kg/m³) | | | | | |
|---|---|---|---|---|---|---|---|---|
| | | | Cement | Water | Fine Aggregates | Coarse Aggregates | AE water reducing agent | Amount of waterproof admixture |
| Exam. 1 | 57.7 | 45.0 | 300 | 173 | 809 | 1001 | 0.9 | 3 kg |
| Exam. 2 | 57.7 | 45.0 | 300 | 173 | 809 | 1001 | 0.9 | 6 kg |
| Exam. 3 | 57.7 | 45.0 | 300 | 173 | 809 | 1001 | 0.9 | 9 kg |
| Exam. 4 | 57.7 | 45.0 | 300 | 173 | 809 | 1001 | 0.9 | 12 kg |
| Exam. 5 | 57.7 | 45.0 | 300 | 173 | 809 | 1001 | 0.9 | 15 kg |
| Exam. 6 | 57.7 | 45.0 | 300 | 173 | 809 | 1001 | 0.9 | 18 kg |
| Exam. 7 | 57.7 | 45.0 | 300 | 173 | 809 | 1001 | 0.9 | 21 kg |
| Exam. 8 | 57.7 | 45.0 | 300 | 173 | 809 | 1001 | 0.9 | 24 kg |
| Comp. Exam. 1 | 57.7 | 45.0 | 300 | 173 | 809 | 1001 | 0.9 | 9 kg |
| Comp. Exam. 2 | 57.7 | 45.0 | 300 | 173 | 809 | 1001 | 0.9 | 15 kg |
| Comp. Exam. 3 | 57.7 | 45.0 | 300 | 173 | 809 | 1001 | 0.9 | Not added |

The fine aggregates shown in Table 1 had a specific gravity of 2.60, and the coarse aggregates had a specific gravity of 2.63.

concrete of Examples more durable. In particular, when the amount of the waterproof admixtures added was higher than 2 parts by weight based on 100 parts by weight of the cement, all physical properties are excellent. When the amount exceeded 6 parts by weight (Examples 7 and 8), few effects were improved.

As can be seen from the data shown in Table 1 above, the concrete fabricated in Examples 7 and 8 where an excess of waterproof admixtures was added over the range defined in

TABLE 2

| Exam. No. | Slump (cm) | Air amount (%) | Setting time (hr:min) | | Compressive strength | | Water permeability Ratio | water absorption ratio | Relative Resilient modulus (%) |
|---|---|---|---|---|---|---|---|---|---|
| | | | Initial setting | Final setting | 7 days | 28 days | | | |
| Exam. 1 | 7.5 | 4.4 | 8:50 | 10:40 | 98 | 102 | 0.85 | 0.88 | 84 |
| Exam. 2 | 7.5 | 4.6 | 8:30 | 10:50 | 102 | 108 | 0.63 | 0.66 | 87 |
| Exam. 3 | 8.5 | 4.4 | 8:45 | 10:35 | 106 | 109 | 0.42 | 0.41 | 93 |
| Exam. 4 | 9.5 | 4.3 | 8:30 | 10:15 | 107 | 111 | 0.35 | 0.36 | 94 |
| Exam. 5 | 10.0 | 4.2 | 8:10 | 10:10 | 107 | 113 | 0.26 | 0.29 | 96 |
| Exam. 6 | 10.0 | 4.0 | 7:45 | 9:45 | 106 | 112 | 0.24 | 0.28 | 96 |
| Exam. 7 | 8.5 | 2.6 | 6:15 | 8:00 | 104 | 107 | 0.25 | 0.26 | 89 |
| Exam. 8 | 7.0 | 1.5 | 5:00 | 6:10 | 100 | 109 | 0.28 | 0.27 | 84 |
| Comp. Exam. 1 | 8.0 | 4.3 | 9:45 | 12:25 | 96 | 91 | 0.51 | 0.45 | 89 |
| Comp. Exam. 2 | 8.5 | 3.7 | 10:10 | 13:45 | 90 | 87 | 0.39 | 0.34 | 93 |
| Comp. Exam. 3 | 7.5 | 4.7 | 8:40 | 10:35 | 100 | 100 | 1.00 | 1.00 | 83 |

As can be seen from the data shown in Tables 1 and 2, as a result of evaluating waterproofness, the workability and strength ratio of the concrete and resistance to water absorption and permeation of the concrete containing the waterproof admixtures were better, compared to the concrete containing no waterproof admixture. Under the same conditions, the concrete containing the waterproof admixtures of the present invention exhibited excellent concrete quality, compared to the concrete containing conventional waterproof admixtures.

Improvement in the waterproofness of the concrete is fabricated in Examples above can block water absorption into the concrete and minimized the deterioration in the relative resilient modulus of the concrete, compared to the concrete fabricated in Comparative Example 3, making the the present invention showed deterioration in quality of uncured concrete quality, e.g., dropped air amount in the concrete, decreased workability, shortened setting time (stiffening), due to the characteristics of the inorganic salt and silica fume, and further improvements in the quality (freezing and thawing resistance, strength increasing rate) of cured concrete were reduced.

These results indicate that the waterproof admixture composition formulated in accordance with the present invention is preferably added in an amount of 2~6 parts by weight, based on 100 parts by weight of cement.

EXAMPLES 9 TO 15

780 parts by weight of calcium nitrite as an inorganic salt, 60 parts by weight of tannin as an antioxidant, 1,383 parts by weight of fly ash, 288 parts by weight of silica fume, 231 parts by weight of a higher fatty acid-based metal salt, 120 parts by weight of polynaphthalene sulphonate, 138 parts by weight of a redispersible powders polymer containing an ethylene/vinyl laurate/vinyl chloride terpolymer as a main component, were mixed to formulate a waterproof admixture.

The waterproof admixture thus formulated was added in accordance with the blending ratios shown in Table 3 below to 100 parts by weight of cement to fabricate concrete. The anti-corrosiveness of reinforcing steel bars in the fabricated concrete was evaluated by a corrosion promotion test for the reinforcing steel bars in accordance with the KS F 2561 standard method. The results are shown in Table 4 below. For the evaluation of the corrosion promotion for the reinforcing steel bars and anti-corrosive performance of each admixture, the salt concentration in sand was adjusted to 2,000 ppm (baseline for the KS F 2561 method) based on the sand used in the concrete, and 5,000 ppm, which corresponds to 2.5 times higher than the baseline. The blending conditions for fabricating the concrete are listed in Table 3 below.

tration in sand was adjusted to 2,000 ppm (baseline for the KS F 2561 method) based on the sand used in the concrete, and 5,000 ppm, which corresponds to 2.5 times higher than the baseline. The blending conditions for fabricating the concrete are listed in Table 3 below.

COMPARATIVE EXAMPLE 5

Concrete was fabricated without the addition of a waterproof admixture. The anti-corrosiveness of reinforcing steel bars in the fabricated concrete was evaluated by a corrosion promotion test for the reinforcing steel bars in accordance with the KS F 2561 standard method. The results are shown in Table 4 below. For the evaluation of the corrosion promotion for the reinforcing steel bars and anti-corrosive performance of each admixture, the salt concentration in sand was adjusted to 2,000 ppm (baseline for the KS F 2561 method) based on the sand used in the concrete, and 5,000 ppm, which corresponds to 2.5 times higher than the baseline. The blending conditions for fabricating the concrete are listed in Table 3 below.

TABLE 3

| Exam. No. | Salt concentration in fine aggregates (ppm) | W/C (%) | S/A (%) | Amount of cement (kg/m$^3$) | Amount of fine aggregates (kg/m$^3$) | Amount of coarse aggregates (kg/m$^3$) | Water (kg/m$^3$) | Salt solution (kg/m$^3$) | Admixture (kg/m$^3$) |
|---|---|---|---|---|---|---|---|---|---|
| Exam. 9 | 2,000 | 60.0 | 47.0 | 300 | 821 | 986 | 131.5 | 48.5 | 3 |
|  | 5,000 | 60.0 | 47.0 | 300 | 821 | 986 | 59 | 121 | 3 |
| Exam. 10 | 2,000 | 60.0 | 47.0 | 300 | 821 | 986 | 131.5 | 48.5 | 6 |
|  | 5,000 | 60.0 | 47.0 | 300 | 821 | 986 | 59 | 121 | 6 |
| Exam. 11 | 2,000 | 60.0 | 47.0 | 300 | 821 | 986 | 131.5 | 48.5 | 9 |
|  | 5,000 | 60.0 | 47.0 | 300 | 821 | 986 | 59 | 121 | 9 |
| Exam. 12 | 2,000 | 60.0 | 47.0 | 300 | 821 | 986 | 131.5 | 48.5 | 12 |
|  | 5,000 | 60.0 | 47.0 | 300 | 821 | 986 | 59 | 121 | 12 |
| Exam. 13 | 2,000 | 60.0 | 47.0 | 300 | 821 | 986 | 131.5 | 48.5 | 15 |
|  | 5,000 | 60.0 | 47.0 | 300 | 821 | 986 | 59 | 121 | 15 |
| Exam. 14 | 2,000 | 60.0 | 47.0 | 300 | 821 | 986 | 131.5 | 48.5 | 18 |
|  | 5,000 | 60.0 | 47.0 | 300 | 821 | 986 | 59 | 121 | 18 |
| Exam. 15 | 2,000 | 60.0 | 47.0 | 300 | 821 | 986 | 131.5 | 48.5 | 21 |
|  | 5,000 | 60.0 | 47.0 | 300 | 821 | 986 | 59 | 121 | 21 |
| Comp. Exam. 4 | 2,000 | 60.0 | 47.0 | 300 | 821 | 986 | 131.5 | 48.5 | 15 |
|  | 5,000 | 60.0 | 47.0 | 300 | 821 | 986 | 59 | 121 | 15 |
| Comp. Exam. 5 | 2,000 | 60.0 | 47.0 | 300 | 821 | 986 | 131.5 | 48.5 | Not added |
|  | 5,000 | 60.0 | 47.0 | 300 | 821 | 986 | 59 | 121 | Not added |

COMPARATIVE EXAMPLE 4

1,360 parts by weight of fly ash was charged into an operating blender, and then 10 parts by weight of methylcellulose, 500 parts by weight of zinc stearate, 15 parts by weight of barium chloride, 100 parts by weight of pozzolith (standard type) and 15 parts by weight of sodium metasilicate were sequentially added thereto to formulate a waterproof admixture.

5 parts by weight of the waterproof admixture thus formulated was added to 100 parts by weight of cement to fabricate concrete. The anti-corrosiveness of reinforcing steel bars in the fabricated concrete was evaluated by a corrosion promotion test for the reinforcing steel bars in accordance with the KS F 2561 standard method. The results are shown in Table 4 below. For the evaluation of the corrosion promotion for the reinforcing steel bars and anti-corrosive performance of each admixture, the salt concentration in sand was adjusted to 2,000 ppm (baseline for the KS F 2561 method) based on the sand used in the concrete, and 5,000 ppm, which corresponds to 2.5 times higher than the baseline. The blending conditions for fabricating the concrete are listed in Table 3 below.

TABLE 4

| Exam. No. | Salt concentration in fine aggregates (ppm) | Area of corroded parts in reinforcing steel bars (mm$^2$) | | | | Average area of corroded parts (mm$^2$) | Anti-corrosion ratio(%) |
|---|---|---|---|---|---|---|---|
|  |  | 1 | 2 | 3 | 4 |  |  |
| Exam. 9 | 2,000 | 58.9 | 74.8 | 32.5 | 45.7 | 53.0 | 31.4 |
|  | 5,000 | 77.8 | 84.5 | 123.2 | 138.5 | 106.0 | 12.4 |
| Exam. 10 | 2,000 | 5.6 | 7.5 | 10.5 | 9.5 | 8.3 | 89.2 |
|  | 5,000 | 22.4 | 25.6 | 22.0 | 24.6 | 23.7 | 80.4 |
| Exam. 11 | 2,000 | 3.3 | 2.8 | 2.6 | 3.5 | 3.0 | 96.1 |
|  | 5,000 | 5.4 | 6.3 | 6.1 | 5.2 | 5.8 | 95.2 |
| Exam. 12 | 2,000 | 2.2 | 2.0 | 2.3 | 2.7 | 2.3 | 97.0 |
|  | 5,000 | 5.0 | 5.3 | 4.2 | 3.5 | 4.5 | 96.3 |
| Exam. | 2,000 | 1.8 | 1.0 | 1.6 | 0.0 | 1.1 | 98.6 |

TABLE 4-continued

| Exam. No. | Salt concentration in fine aggregates (ppm) | Area of corroded parts in reinforcing steel bars (mm²) | | | | Average area of corroded parts (mm²) | Anti-corrosion ratio(%) |
|---|---|---|---|---|---|---|---|
| | | 1 | 2 | 3 | 4 | | |
| 13 | 5,000 | 3.9 | 4.0 | 3.1 | 3.3 | 3.6 | 97.0 |
| Exam. 14 | 2,000 | 0.5 | 0.8 | 1.2 | 0.3 | 0.7 | 99.1 |
| | 5,000 | 2.2 | 3.1 | 2.8 | 3.0 | 2.8 | 97.7 |
| Exam. 15 | 2,000 | 0.4 | 1.1 | 1.0 | 0.5 | 0.8 | 99.0 |
| | 5,000 | 2.1 | 4.0 | 2.2 | 2.6 | 2.7 | 97.7 |
| Comp. Exam. 4 | 2,000 | 79.4 | 69.5 | 36.4 | 84.5 | 67.5 | 12.7 |
| | 5,000 | 114.5 | 118.6 | 98.0 | 140.6 | 117.9 | 2.6 |
| Comp. Exam. 5 | 2,000 | 88.2 | 102.0 | 64.8 | 54.0 | 77.3 | 0 |
| | 5,000 | 112.5 | 127.8 | 143.5 | 100.5 | 121.1 | 0 |

As is apparent from Tables 3 and 4 above, as a result of evaluating the anti-corrosive performance of the composition according to the present invention, anti-corrosive effects of the composition were distinctly exhibited at a salt concentration of 2,000 ppm specified in the KS F 2561 standard method. As the amount of the admixtures increased, the anti-corrosive effects were improved. The concrete fabricated in Example 10 where 2 parts by weight of the admixture was added to 100 parts by weight of cement exhibited greatly improved anti-corrosive effects. However, in the concrete fabricated in Example 15 where more than 6 parts by weight of the admixture was added to 100 parts by weight of cement, few anti-corrosive effects were improved.

For evaluating the anti-corrosive performance of reinforcing steel bars, the salt concentration in sand was adjusted to 5,000 ppm, which corresponds to 2.5 times higher than the test baseline. As a result, the concrete of Example 10 to 14 fabricated within the preferred range defined in the present invention exhibited excellent anti-corrosive effects.

EXAMPLES 16 TO 20

900 parts by weight of calcium nitrite as an inorganic salt, 30 parts by weight of tannin as an antioxidant, 1,273 parts by weight of fly ash, 318 parts by weight of silica fume, 291 parts by weight of a higher fatty acid-based metal salt, 120 parts by weight of polymelamin sulphonate, 68 parts by weight of a redispersible powders polymer containing a vinyl acetate/ethylene copolymer as a main component, were mixed to formulate a waterproof admixture.

1.0, 2.0, 3.0, 4.0, 5.0, 6.0, 7.0 and 8.0 parts by weight of the waterproof admixture thus formulated were added to 100 parts by weight of cement to fabricate concrete, respectively. Slumps, air amount, setting time, compressive strength, water permeability ratio, water absorption ratio and relative resilient modulus of the concrete were measured in accordance with the KS F 4926 standard method. The results are shown in Table 6 below. The blending conditions for fabricating the concrete are listed in Table 5 below.

COMPARATIVE EXAMPLE 6

1,360 parts by weight of fly ash was charged into an operating blender, and then 10 parts by weight of methylcellulose, 500 parts by weight of zinc stearate, 15 parts by weight of barium chloride, 100 parts by weight of pozzolith (standard type) and 15 parts by weight of sodium metasilicate were sequentially added thereto to formulate a waterproof admixture.

4 parts by weight of the waterproof admixture thus formulated was added to 100 parts by weight of cement to fabricate concrete. Slumps, air amount, setting time, compressive strength, water permeability ratio, water absorption ratio and relative resilient modulus of the concrete were measured in accordance with the KS F 4926 standard method. The results are shown in Table 6 below. The blending conditions for fabricating the concrete are listed in Table 5 below.

COMPARATIVE EXAMPLE 7

Concrete was fabricated without the addition of a waterproof admixture. Slumps, air amount, setting time, compressive strength, water permeability ratio, water absorption ratio and relative resilient modulus of the concrete were measured in accordance with the KS F 4926 standard method. The results are shown in Table 6 below. The blending conditions for fabricating the concrete are listed in Table 5 below.

TABLE 5

| | Amounts of respective materials (kg/m³) | | | | | | |
|---|---|---|---|---|---|---|---|
| Exam. No. | W/C (%) | S/A (%) | Cement | Water | Fine aggregates | Coarse aggregates | AE water-reducing agent | Amount of Waterproof admixture |
| Exam. 16 | 56.6 | 47.0 | 320 | 181 | 840 | 958 | 0.96 | 3.2 kg |
| Exam. 17 | 56.6 | 47.0 | 320 | 181 | 840 | 958 | 0.96 | 6.4 kg |
| Exam. 18 | 56.6 | 47.0 | 320 | 181 | 840 | 958 | 0.96 | 12.8 kg |
| Exam. 19 | 56.6 | 47.0 | 320 | 181 | 840 | 958 | 0.96 | 19.2 kg |
| Exam. 20 | 56.6 | 47.0 | 320 | 181 | 840 | 958 | 0.96 | 22.4 kg |
| Comp. Exam. 6 | 56.6 | 47.0 | 320 | 181 | 840 | 958 | 0.96 | 12.8 kg |
| Comp. Exam. 7 | 56.6 | 47.0 | 320 | 181 | 840 | 958 | 0.96 | Not added |

TABLE 6

| Exam. No. | Slump (cm) | Air Amount (%) | Setting time (hr:min) Initial setting | Setting time (hr:min) Final setting | Compressive strength 7 days | Compressive strength 28 days | Water Permeability Ratio | Water Absorption ratio | Relative resilient Modulus (%) |
|---|---|---|---|---|---|---|---|---|---|
| Exam. 16 | 11.5 | 4.4 | 8:10 | 10:10 | 102 | 98 | 0.73 | 0.74 | 85 |
| Exam. 17 | 12.5 | 4.6 | 8:25 | 10:20 | 97 | 103 | 0.53 | 0.54 | 90 |
| Exam. 18 | 13.0 | 4.2 | 8:00 | 10:25 | 102 | 107 | 0.28 | 0.32 | 95 |
| Exam. 19 | 13.0 | 3.7 | 7:25 | 9:10 | 98 | 109 | 0.26 | 0.26 | 95 |
| Exam. 20 | 11.0 | 2.9 | 5:55 | 8:20 | 104 | 102 | 0.27 | 0.26 | 94 |
| Comp. Exam. 6 | 12.5 | 3.9 | 9:10 | 13:05 | 87 | 86 | 0.48 | 0.47 | 87 |
| Comp. Exam. 7 | 11.0 | 4.5 | 8:20 | 10:25 | 100 | 100 | 1.00 | 1.00 | 84 |

Waterproof admixtures containing increased concentrations of the calcium nitrite and the higher fatty acid-based metal salt were formulated. After concrete was fabricated from the waterproof admixtures, the waterproofness of the concrete was evaluated. As a result, various characteristics of the concrete were proved to be excellent, e.g., resistance to water absorption and permeation of the concrete. In particular, the concrete containing the waterproof admixtures of the present invention exhibited excellent concrete quality, compared to the concrete containing conventional waterproof admixtures under the same conditions. The concrete of Example 17 to 19 fabricated within the preferred range defined in the present invention exhibited excellent waterproofing effects.

EXAMPLES 21 TO 25

900 parts by weight of calcium nitrite as an inorganic salt, 30 parts by weight of tannin as an antioxidant, 1,273 parts by weight of fly ash, 318 parts by weight of silica fume, 291 parts by weight of a higher fatty acid-based metal salt, 120 parts by weight of polymelamin sulphonate, 68 parts by weight of a redispersible powders polymer containing a vinyl acetate/ethylene copolymer as a main component, were mixed to formulate a waterproof admixture.

1.0, 2.0, 4.0, 6.0 and 7.0 parts by weight of the waterproof admixture thus formulated were added to 100 parts by weight of cement to fabricate concrete, respectively. The anti-corrosiveness of reinforcing steel bars in the fabricated concrete was evaluated by a corrosion promotion test for the reinforcing steel bars in accordance with the KS F 2561 standard method. The results are shown in Table 8 below. For the evaluation of the corrosion promotion for the reinforcing steel bars and anti-corrosive performance of each admixture, the salt concentration in sand was adjusted to 5,000 ppm, based on the sand used in the concrete. The blending conditions for fabricating the concrete are listed in Table 7 below.

COMPARATIVE EXAMPLE 8

1,360 parts by weight of fly ash was charged into an operating blender, and then 10 parts by weight of methylcellulose, 500 parts by weight of zinc stearate, 15 parts by weight of barium chloride, 100 parts by weight of pozzolith (standard type) and 15 parts by weight of sodium metasilicate were sequentially added thereto to formulate a waterproof admixture.

4 parts by weight of the waterproof admixture thus formulated was added to 100 parts by weight of cement to fabricate concrete. The anti-corrosiveness of reinforcing steel bars in the fabricated concrete was evaluated by a corrosion promotion test for the reinforcing steel bars in accordance with the KS F 2561 standard method. The results are shown in Table 8 below. The blending conditions for fabricating the concrete are listed in Table 7 below.

COMPARATIVE EXAMPLE 9

Concrete was fabricated without the addition of a waterproof admixture. The anti-corrosiveness of reinforcing steel bars in the fabricated concrete was evaluated by a corrosion promotion test for the reinforcing steel bars in accordance with the KS F 2561 standard method. The results are shown in Table 8 below. The blending conditions for fabricating the concrete are listed in Table 7 below.

TABLE 7

| Exam. No. | Salt concentration in fine aggregates (ppm) | W/C (%) | S/A (%) | Amount of cement (kg/m$^3$) | Fine aggregates (kg/m$^3$) | Coarse Aggregates (kg/m$^3$) | Water (kg/m$^3$) | Salt solution (kg/m$^3$) | Admixture (kg/m$^3$) |
|---|---|---|---|---|---|---|---|---|---|
| Exam. 21 | 5,000 | 60.0 | 47.0 | 300 | 821 | 986 | 59 | 121 | 3 |
| Exam. 22 | | 60.0 | 47.0 | 300 | 821 | 986 | 59 | 121 | 6 |
| Exam. 23 | | 60.0 | 47.0 | 300 | 821 | 986 | 59 | 121 | 12 |
| Exam. 24 | | 60.0 | 47.0 | 300 | 821 | 986 | 59 | 121 | 18 |
| Exam. 25 | | 60.0 | 47.0 | 300 | 821 | 986 | 59 | 121 | 21 |

TABLE 7-continued

| Exam. No. | Salt concentration in fine aggregates (ppm) | W/C (%) | S/A (%) | Amount of cement (kg/m³) | Fine aggregates (kg/m³) | Coarse Aggregates (kg/m³) | Water (kg/m³) | Salt solution (kg/m³) | Admixture (kg/m³) |
|---|---|---|---|---|---|---|---|---|---|
| Comp. Exam. 8 | | 60.0 | 47.0 | 300 | 821 | 986 | 59 | 121 | 12 |
| Comp. Exam. 9 | | 60.0 | 47.0 | 300 | 821 | 986 | 59 | 121 | Not added |

TABLE 8

| Exam. No. | Salt concentration in fine aggregates (ppm) | Area of corroded parts in reinforcing steel bars (mm²) | | | | Average area of corroded parts (mm²) | Anti-corrosion ratio(%) |
|---|---|---|---|---|---|---|---|
| | | 1 | 2 | 3 | 4 | | |
| Exam. 21 | 5,000 | 61.4 | 30.6 | 70.2 | 39.8 | 50.5 | 42.1 |
| Exam. 22 | | 6.1 | 6.9 | 9.5 | 9.0 | 7.9 | 90.0 |
| Exam. 23 | | 3.5 | 2.4 | 3.0 | 2.4 | 2.8 | 96.8 |
| Exam. 24 | | 2.6 | 2.5 | 2.0 | 1.7 | 2.2 | 97.5 |
| Exam. 25 | | 2.5 | 1.9 | 2.6 | 2.1 | 2.3 | 97.4 |
| Comp. Exam. 8 | | 86.5 | 74.6 | 55.4 | 98.5 | 78.8 | 9.8 |
| Comp. Exam. 9 | | 95.0 | 110.0 | 75.3 | 69.0 | 87.3 | 0 |

As can be seen from the data shown in Tables 7 and 8, Waterproof admixtures containing increased concentrations of the calcium nitrite and the higher fatty acid-based metal salt were formulated. After concrete was fabricated from the waterproof admixtures, the waterproofness of the concrete was evaluated. As a result, anti-corrosive effects of the concrete were proved to be excellent. In particular, the concrete of Example 22 to 24 fabricated within the preferred range defined in the present invention exhibited excellent anti-corrosive effects.

However, the concrete fabricated in Example 25 where an excess of waterproof admixtures was added over the range defined in the present invention showed little improvement in anti-corrosive effects.

In conclusion, the concrete fabricated from the waterproof admixture composition of the present invention exhibited very good results in the waterproofness and anti-corrosive performance of the concrete. In addition, the waterproof admixture of the present invention exhibited excellent waterproofing and anti-corrosive performance, compared to conventional spherical waterproof admixtures and anti-corrosive admixtures.

As apparent from the above description, the waterproof admixture composition for concrete having excellent anti-corrosive performance according to the present invention prevents the corrosion of reinforcing steel bars through chemical and physical interaction with concrete and the reinforcing steel bars, and reduces the water permeability and absorptivity through the formation of water tight cured bodies of concrete and highly water resistant hydrated tissues, thereby fabricating highly durable concrete. In particular, since the waterproof admixture composition of the present invention exhibits excellent waterproofing performance and thus protects reinforcing steel bars against oxidation in the presence of salt, thereby ensuring excellent anti-corrosive performance, it can be usefully utilized in concrete structures located in highly salty coastal and sea areas and environmental contaminant-processing facilities.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A waterproof admixture composition for concrete having excellent anti-corrosive performance, comprising fly ash and silica fume as artificial pozzolan activators, a redispersible powders resin, a higher fatty acid-based metal salt and a high performance water-reducing agent,
   wherein the composition further comprises 18 to 34% by weight of an inorganic salt and 1 to 5% by weight of tannin as an antioxidant, based on the total weight of the composition.

2. The waterproof admixture composition for concrete having excellent anti-corrosive performance according to claim 1, wherein the inorganic salt is calcium nitrite or sodium nitrite.

3. The waterproof admixture composition for concrete having excellent anti-corrosive performance according to claim 1, wherein the fly ash as an artificial pozzolan activator is present in an amount of 40~60% by weight, the silica fume is present in an amount of 6~12% by weight, the redispersible powders resin is present in an amount of 0.5~5% by weight, the higher fatty acid-based metal salt is present in an amount of 5~11% by weight and the high performance water-reducing agent is present in an amount of 1~6% by weight, based on the total weight of the composition.

4. A method for fabricating concrete by adding the waterproof admixture composition for concrete according to claim 1 in an amount of 2.0~6.0 parts by weight to cement, based on 100 parts by weight of the cement.

5. The waterproof admixture composition for concrete having excellent anti-corrosive performance according to claim 2, wherein the fly ash as an artificial pozzolan activator is present in an amount of 40~60% by weight, the silica fume is present in an amount of 6~12% by weight, the redispersible powders resin is present in an amount of 0.5~5% by weight, the higher fatty acid-based metal salt is present in an amount of 5~11% by weight and the high performance water-reducing agent is present in an amount of 1~6% by weight, based on the total weight of the composition.

* * * * *